(12) United States Patent
Kim et al.

(10) Patent No.: US 10,703,179 B2
(45) Date of Patent: Jul. 7, 2020

(54) LIGHTING APPARATUS HAVING LIGHT-FILTERING FUNCTION AND VEHICLE SUNROOF USING THE SAME

(71) Applicant: LG DISPLAY CO., LTD., Seoul (KR)

(72) Inventors: Nam-Kook Kim, Suwon-si (KR); Jung-Eun Lee, Seoul (KR); Tae-Ok Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 121 days.

(21) Appl. No.: 16/031,545

(22) Filed: Jul. 10, 2018

(65) Prior Publication Data

US 2019/0016198 A1   Jan. 17, 2019

(30) Foreign Application Priority Data

Jul. 11, 2017 (KR) .......................... 10-2017-0088051

(51) Int. Cl.

| | |
|---|---|
| *G02F 1/15* | (2019.01) |
| *B60J 3/04* | (2006.01) |
| *B32B 17/10* | (2006.01) |
| *B60Q 3/208* | (2017.01) |
| *G02F 1/155* | (2006.01) |
| *G02F 1/01* | (2006.01) |
| *G02F 1/163* | (2006.01) |

(52) U.S. Cl.
CPC ........... *B60J 3/04* (2013.01); *B32B 17/10027* (2013.01); *B32B 17/10486* (2013.01); *B32B 17/10513* (2013.01); *B60Q 3/208* (2017.02); *G02F 1/0136* (2013.01); *G02F 1/155* (2013.01); *B32B 2307/412* (2013.01); *B32B 2315/08* (2013.01); *G02F 1/163* (2013.01); *G02F 2001/1552* (2013.01); *G02F 2001/1635* (2013.01)

(58) Field of Classification Search
CPC ........................................................ B60J 3/04
USPC ............................................................ 359/265
See application file for complete search history.

(56) References Cited

U.S. PATENT DOCUMENTS

2017/0117505 A1*  4/2017  Kwon ..................... G02F 1/157
2017/0178595 A1    6/2017  Kim et al.

FOREIGN PATENT DOCUMENTS

| CN | 1989445 A   | 6/2007 |
|----|-------------|--------|
| CN | 102694130 A | 9/2012 |

(Continued)

*Primary Examiner* — James C. Jones
(74) *Attorney, Agent, or Firm* — Birch, Stewart, Kolasch & Birch, LLP

(57) ABSTRACT

Discussed is a lighting apparatus having an organic light-emitting element configured as a transparent window and provided with an optical filter to prevent transmission of light when light having an intensity higher than a preset intensity is incident on the lighting apparatus so as to allow the lighting apparatus to be driven in a transparent mode, an opaque mode, and a lighting mode. The organic light-emitting element includes first and second electrodes and an organic emission layer disposed between the first electrode and the second electrode to emit light when a signal is applied thereto. The organic light-emitting element performs single-side emission or dual-side emission. The optical filter is formed of a photochromic material or an electrochromic material to make the lighting apparatus be opaque so as to adjust the transmissivity of light when the light having the intensity higher than the preset intensity is incident on the lighting apparatus.

18 Claims, 11 Drawing Sheets

(56) References Cited

FOREIGN PATENT DOCUMENTS

| CN | 104122729 A | 10/2014 |
|---|---|---|
| CN | 105960717 A | 9/2016 |

* cited by examiner

LIGHTING APPARATUS HAVING LIGHT-FILTERING FUNCTION AND VEHICLE SUNROOF USING THE SAME

This application claims the priority benefit of Korean Patent Application No. 10-2017-0088051 filed on Jul. 11, 2017 in Republic of Korea, which is hereby incorporated by reference as if fully set forth herein.

BACKGROUND OF THE INVENTION

Field of the Invention

The present invention relates to a lighting apparatus, and more particularly to a lighting apparatus having a light-filtering function and a vehicle sunroof using the same.

Discussion of the Related Art

In general, a vehicle sunroof is a device for introducing outside air or solar light through the ceiling of a vehicle. By forming a predetermined area of the vehicle ceiling so as to be opened and closed, the sunroof is opened or closed as necessary.

Recently, such a sunroof is manufactured with a transparent window to allow external light to be introduced into a passenger compartment even in the closed state of the sunroof. This makes a pleasant passenger compartment and enables a vehicle occupant to view the outside through the ceiling to enjoy a sense of freedom.

However, in the case of the sunroof manufactured with the transparent window, solar light including ultraviolet light may enter the passenger compartment through the sunroof when the sun is strong, causing the temperature inside the passenger compartment to rise and the occupant exposed to direct sunlight to experience discomfort. Although some of the light that is introduced may be filtered by lowering the transparency of the window-type sunroof, this makes it impossible to fully appreciate the outside view through the sunroof.

Further, since the ceiling of the vehicle has a given area, a large sunroof may limit the space of other devices to be installed on the ceiling, for example, a lighting apparatus. For this reason, the vehicle sunroof faces limitations in the manufacture thereof.

SUMMARY OF THE INVENTION

Accordingly, the present invention is directed to a lighting apparatus having a light-filtering function and a vehicle sunroof using the same that substantially obviate one or more problems due to limitations and disadvantages of the related art.

The present invention has been provided to solve the problems described above, and one object of the present invention is to provide a lighting apparatus, which is transparent and is provided with an optical filter so that the lighting apparatus may be selectively driven in a transparent mode, an opaque mode (light-blocking mode), or a lighting mode as necessary.

Another object of the present invention is to provide a lighting apparatus and a vehicle sunroof having the lighting apparatus, which address the limitations and disadvantages associated with the related art.

Another object of the present invention is to provide a vehicle sunroof configured with a lighting apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a lighting apparatus having an organic light-emitting element is configured as a transparent window and is provided with an optical filter, which prevents a transmission of light when light having an intensity higher than a preset intensity is incident on the lighting apparatus, so that the lighting apparatus is driven effectively in one of a transparent mode, an opaque mode, and a lighting mode.

The organic light-emitting element may include a first electrode and a second electrode, and an organic emission layer disposed between the first electrode and the second electrode to emit light when a signal is applied thereto. Here, the organic light-emitting element may perform single-side emission or dual-side emission.

The optical filter may be formed of a photochromic material or an electrochromic material to make the lighting apparatus be opaque so as to adjust the transmissivity of light when the light having the intensity higher than the preset intensity is incident on the lighting apparatus.

In addition, the lighting apparatus may serve as a vehicle sunroof configured to transmit or block light based on the intensity of light introduced from the outside and to be driven as a lamp or light source to brighten a passenger compartment of a vehicle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
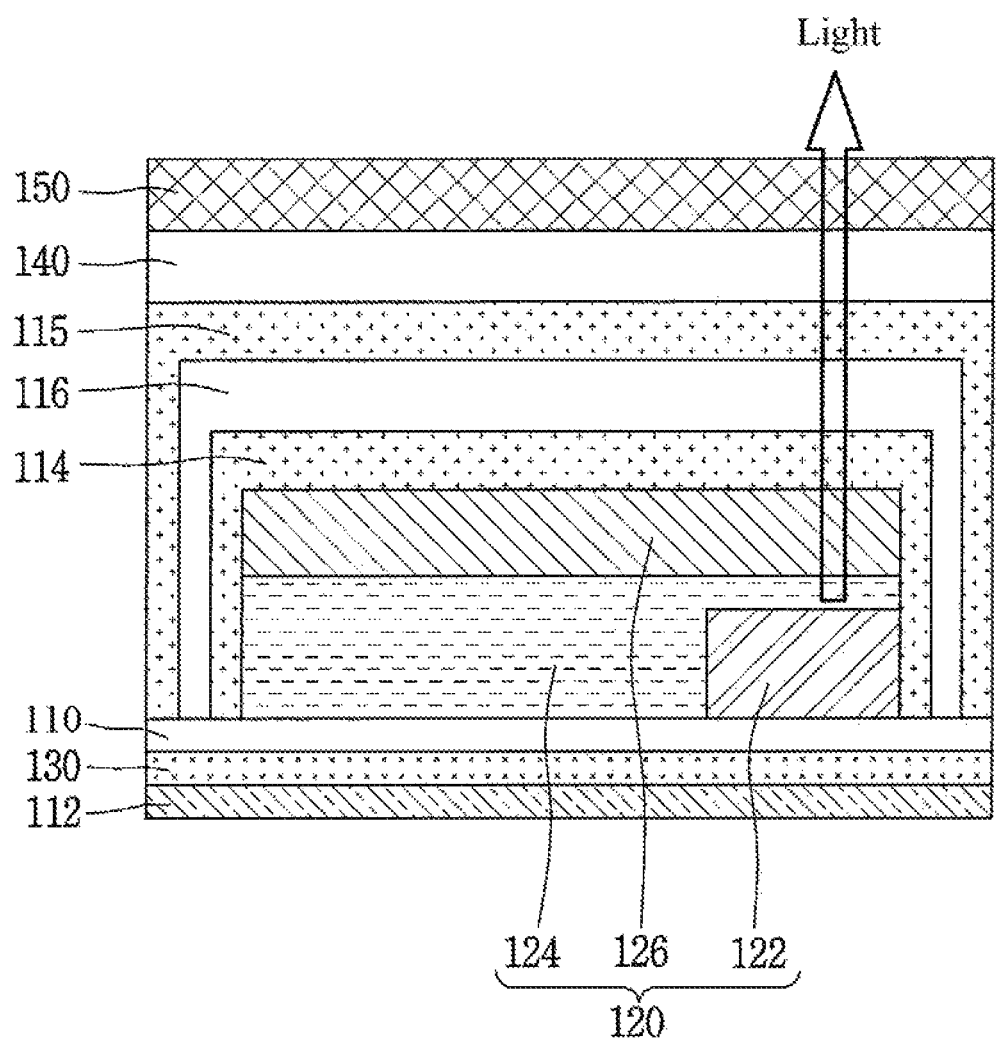
FIG. 1 is a view illustrating a lighting apparatus according to a first embodiment of the present invention.

Hereinafter, the embodiments of the present invention will be described with reference to the accompanying drawings.

The embodiments of the present invention provide a lighting apparatus having an optical filter. The lighting apparatus of the present invention is manufactured to be transparent, and thus serves as a general window, but may emit light to brighten the surroundings as necessary. The lighting apparatus of the present invention may transmit or block light based on the intensity of light using the optical filter.

The optical filter according to the present invention remains in a transparent state when light having a preset intensity or lower is incident thereon, but fully or partially blocks light passing therethrough by displaying a specific color when light having an intensity higher than the preset intensity is incident thereon. Such an optical filter may be formed of a photochromic material or an electrochromic material.

In addition, the lighting apparatus of the present invention functions to brighten dark areas by emitting light. Here, the lighting apparatus may use an inorganic light-emitting element or an organic light-emitting element.

Generally, the inorganic light-emitting element has the highest luminous efficacy within a blue wavelength band, and the luminous efficacy decreases toward a red wavelength band and a green wavelength band having highest visibility. Therefore, in the case in which a red light-emitting diode, a green light-emitting diode, and a blue light-emitting diode are combined to emit white light, the luminous efficacy may be lowered. In addition, when a red light-emitting diode, a green light-emitting diode, and a blue light-emitting diode are used, color rendering is lowered because the peak wavelength of each diode is narrow.

In order to address the problems described above, a lighting apparatus, which combines a blue light-emitting diode with a yellow fluorescent substance to emit white light, instead of combining a red light-emitting diode, a green light-emitting diode, and a blue light-emitting diode, has been proposed. The reason why this type of light-emitting diode is proposed is because a method of using a blue light-emitting diode having high luminous efficacy and further using a fluorescent substance that emits yellow light when receiving blue light is more efficient than the use of a green light-emitting diode having low luminous efficacy.

However, such a lighting apparatus, which combines the blue light-emitting diode with the yellow fluorescent substance to emit white light, also has limitations in the improvement of luminous efficacy thereof because the fluorescent substance that emits yellow light has low luminous efficacy.

On the other hand, an organic light-emitting element formed of an organic luminous substance exhibits relatively good luminous efficacy for green and red light, compared to an inorganic light-emitting element. In addition, the organic light-emitting element has relatively wide peak wavelengths of blue, red, and green, and thus achieves improved color rendering and emits light more like sunlight. Therefore, the lighting apparatus of the present invention utilizes the organic light-emitting element.

As described above, since the lighting apparatus of the present invention includes the optical filter, when the lighting apparatus is applied to a window, the window may remain in a transparent state during the day, but the transmittance of sun light may be reduced via driving of the optical filter when strong sunlight is incident on the window. The window may also be used as a lamp in dark nights. Below, the reference to a lamp is merely one example of how the lighting apparatus can be used as a light source.

The lighting apparatus described above may be used for various purposes. For example, the lighting apparatus of the present invention may be used as a sunroof provided in/at a part of a transportation device or on the ceiling or part of a vehicle such as a car, truck, train, or a bus, or may be used as a building window (at a particular location that requires lighting). Further, the lighting apparatus of the present invention can be used in any device or location where lighting is needed.

FIG. 1 is a view illustrating the structure of a lighting apparatus 100 according to a first embodiment of the present invention. The lighting apparatus 100 is a hard lighting apparatus that is not bendable, and is a single-side-emission-type lighting apparatus that outputs light upwards. All the components of the lighting apparatus according to all embodiments of the present invention are operatively coupled and configured.

As illustrated in FIG. 1, the lighting apparatus 100 of the first embodiment includes a substrate 110 formed of a transparent and hard material such as glass, an organic light-emitting element 120 disposed above the substrate 110 to emit light, and an optical filter 130 disposed below the substrate 110 to adjust the transmittance of light incident thereon.

The organic light-emitting element 120 includes a first electrode 122 and a second electrode 126 disposed on the substrate 110, and an organic emission layer 124 disposed between the first electrode 122 and the second electrode 126. In the lighting apparatus 100 having the above-described structure, when a signal is applied to the first electrode 122 and the second electrode 126 of the organic light-emitting element 120, the organic emission layer 124 emits light so that the light is output upwards from the substrate 110.

Figure 2:
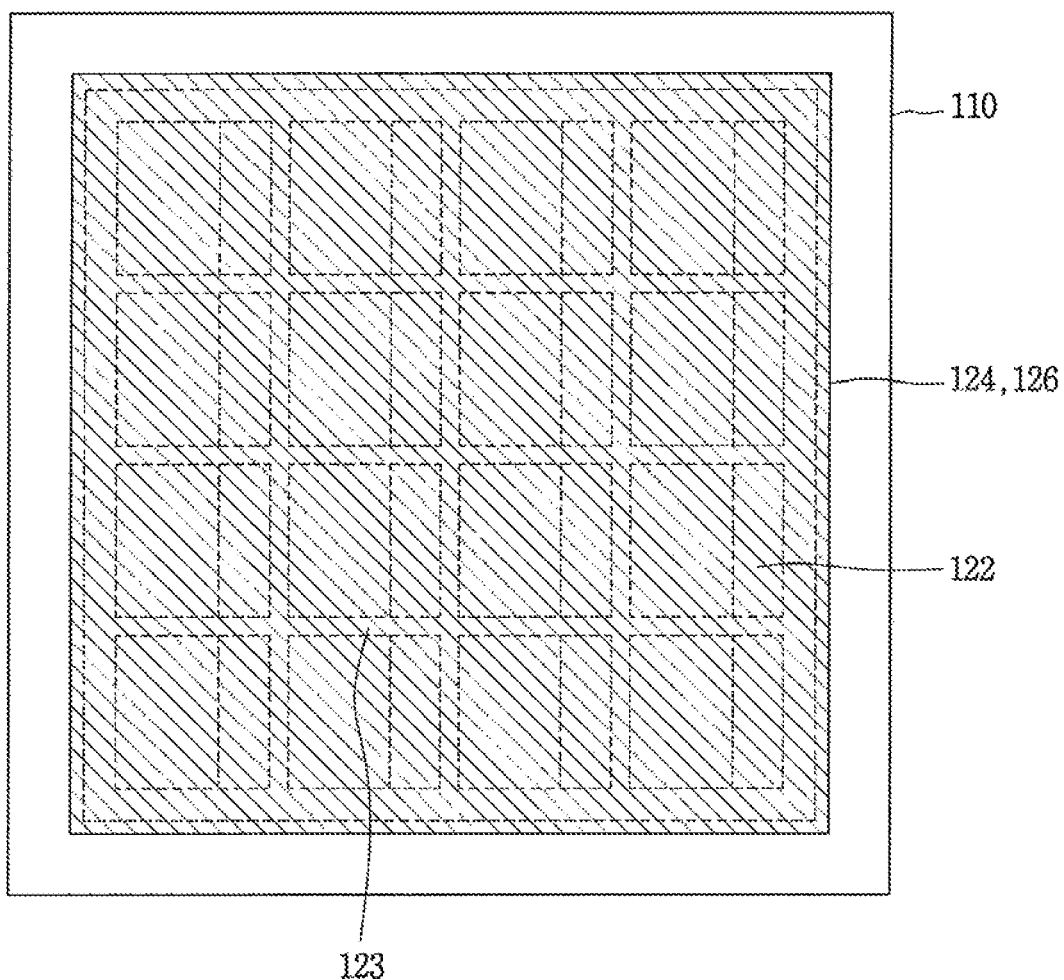
FIG. 2 is a plan view of an organic light-emitting element according to an embodiment of the present invention.

FIG. 2 is a plan view illustrating an example of the structure of the organic light-emitting element 120. As illustrated in FIG. 2, the first electrode 122 is formed on the substrate 110. In addition, an auxiliary electrode 123 is disposed on the substrate 110 and is electrically connected to the first electrode 122. The first electrode 122 may be formed of a metal such as Ca, Ba, Mg, Al, or Ag, or an alloy thereof, and the auxiliary electrode 123 may be formed of a highly conductive metal such as Al, Au, Cu, Ti, W, or Mo, or an alloy thereof. Here, the auxiliary electrode 123 and the first electrode 122 may be formed of the same metal, or different metals.

The auxiliary electrode 123 is disposed in a small-width matrix form, a mesh shape, a hexagonal shape, an octagonal shape, a circular shape, or the like over the entire substrate 110 so as to divide the substrate 110 into a plurality of pixels, and transmits a signal to the first electrodes 122 disposed in the respective pixels so that a uniform voltage is applied to the first electrodes 122 over the entire substrate 110. This makes it possible for the lighting apparatus 100 having a large area to emit light with uniform brightness.

The first electrode 122 is disposed in a portion of each pixel. Since the first electrode 122 is formed of an opaque metal, the lighting apparatus 100 may not be used as a transparent window when the first electrode 122 is disposed in each entire pixel. Therefore, in the present invention, the first electrode 122 is formed only in a portion of each pixel so that the remainder of the pixel in which the first electrode 122 is not formed serves as a transparent window area and the portion in which the first electrode 122 is formed serves as a lighting area from which light is output in a given direction.

The first electrode 122 is formed to have an area required for allowing the lighting apparatus 100 to be used as a transparent window and to emit a sufficient amount of light. For example, the area of the first electrode 122 may be within a range of approximately ¼ to ¾ of the area of the pixel. However, the area of the first electrode 122 is not limited to this particular ratio, but the area ratio of the first electrode 122 to the pixel may be set in various ways based on the size of the transparent lighting apparatus 100, the resolution (pixel size), products to which the lighting apparatus 100 is applied, and the like.

However, in the organic light-emitting element of the present invention, the first electrode 122 may be formed alone on the substrate 110, without the auxiliary electrode 123.

In addition, the organic emission layer 124 and the second electrode 126 are formed above the first electrode 122. The organic emission layer 124 may be a white organic emission layer composed of a red emission layer, a blue emission layer, and a green emission layer, or may have a tandem structure including a blue emission layer and a yellow-green emission layer. In addition, the organic emission layer 124 may include an electron injection layer and a hole injection layer, which inject electrons and holes respectively into the organic emission layer, an electron transport layer and a hole transport layer, which transport the injected electrons and holes respectively to the organic emission layer, and a charge generation layer, which generates charges such as electrons and holes.

The organic emission layer 124 may be formed of an organic material that emits visible light by combining the electrons and holes received respectively from the hole transport layer and the electron transport layer and that has good quantum efficiency with respect to fluorescence or phosphorescence. Examples of this organic material may include a 8-hydroxy-quinoline aluminum complex compound (Alq3), a carbazole-based compound, a dimerized styryl compound, BAlq, a 10-hydroxybenzo quinoline-metal compound, benzoxazole, benzothiazole, and benzimidazole-based compounds, and poly(p-phenylene vinyl) (PPV), but are not limited thereto.

The second electrode 126 may be formed of a transparent metal oxide, such as indium tin oxide (ITO) or indium zinc oxide (IZO).

When the first electrode 122 of the organic light-emitting element 120 described above is an anode, the second electrode 126 is a cathode, and a voltage is applied to the first electrode 122 and the second electrode 126, electrons from the second electrode 126 are injected into the organic emission layer 124 and holes from the first electrode 122 are injected into the organic emission layer 124, whereby excitons are generated in the organic emission layer 124. Through the decay of excitons, light corresponding to a difference in energy between a lowermost unoccupied molecular orbit and a highest occupied molecular orbit of the organic emission layer 124 is generated and is emitted upwards (toward the second electrode 126 in the drawing).

The optical filter 130 blocks or filters the light introduced from the outside to adjust the amount of light passing through the lighting apparatus 100. Here, the optical filter 130 may be formed of a photochromic material or an electrochromic material.

Figure 3A:
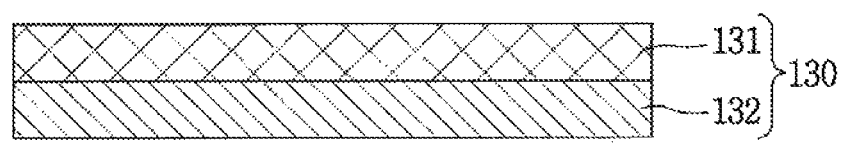
FIGS. 3A to 3C are views illustrating different examples of an optical filter according to the present invention.
Figure 3B:
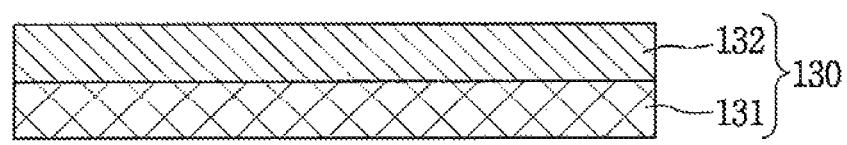
Figure 3C:
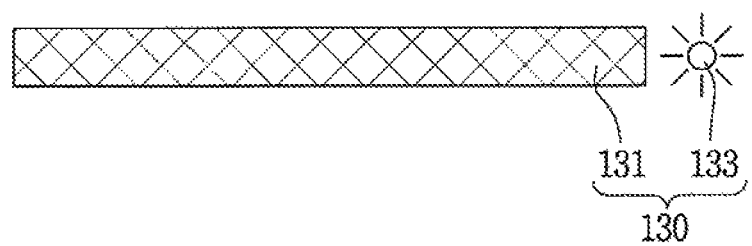

FIGS. 3A to 3C are views illustrating different structures of the optical filter 130 of the lighting apparatus 100. Here, the optical filter 130 is formed of a photochromic material.

FIG. 3A is a view illustrating one example of the optical filter 130 included in the lighting apparatus 100 of the present invention.

As illustrated in FIG. 3A, the optical filter 130 includes a photochromic transition layer 131 and a thin heat-generating layer 132 disposed on the lower surface of the photochromic transition layer 131 to emit heat when a voltage is applied thereto.

The photochromic transition layer 131 is formed of a photochromic material such as azobenzene, triarylmethanes, stilbenes, azastilbenes, nitrones, fulgides, spiropyrans, naphthopyrans, spirooxazines, or quinines, and is changed in the bonding of a chemical constitution thereof when it is irradiated with light, thereby being changed from a transparent state to an opaque state. For example, in the case of azobenzene or spiropyrans, the bonding relationship in a chemical constitution thereof is changed from a colored state to a colorless state when it is irradiated with ultraviolet light, and is then again changed in reverse from the colorless state to the colored state when the irradiation of ultraviolet light is stopped.

The colorless state of the photochromic transition layer 131 corresponds to a transparent state. Thus, when the lighting apparatus 100 is not irradiated with light or is irradiated with light having a preset intensity or lower, the light passes through the photochromic transition layer 131 and the lighting apparatus remains in a transparent state. However, when the lighting apparatus 100 is irradiated with light having an intensity higher than the preset intensity, the photochromic transition layer 131 is changed to the colored state and filters the light so as to adjust the transmittance of light.

Here, a change in the bonding relationship from the colorless state to the colored state by light irradiation is rapidly performed, but a change in the bonding relationship from the colored state to the colorless state is not rapidly performed. Thus, the lighting apparatus 100 does not rapidly return to the transparent state even when the intensity of light introduced to the lighting apparatus 100 in the opaque state is reduced. Therefore, the lighting apparatus 100 of the present invention needs to rapidly return to the transparent state in order to be utilized as a vehicle sunroof, a building window, or the like.

The thin heat-generating layer 132 enables the photochromic transition layer 131 to rapidly return to the transparent state. When a signal is applied to the thin heat-generating layer 132, the thin heat-generating layer 132 generates heat and applies thermal energy to the photochromic transition layer 131. Since the thermal energy changes the bonding relationship of a photochromic material and causes the photochromic transition layer 131 to be rapidly changed from the colored state to the colorless state, the lighting apparatus 100 may rapidly return to the transparent state due to the thin heat-generating layer 132.

Meanwhile, the critical intensity of light for causing the photochromic transition layer 131 to be changed from the colorless state to the colored state varies depending on the photochromic material of the photochromic transition layer 131. The color of the photochromic transition layer 131 in the opaque state or the transmissivity of light of the photochromic transition layer 131 is determined by the photochromic material of the photochromic transition layer 131.

FIG. 3B is a view illustrating another example of the optical filter 130 included in the lighting apparatus 100 of the present invention. In this example, the thin heat-generating layer 132 is disposed on the upper surface of the photochromic transition layer 131 to apply heat to the photochromic transition layer 131, whereby the transmittance of light through the lighting apparatus 100 is adjusted by adjusting the transparent state and the opaque state of the thin heat-generating layer 132.

FIG. 3C is a view illustrating another example of the optical filter 130 included in the lighting apparatus 100 of the present invention.

As illustrated in FIG. 3C, the optical filter 130 includes the photochromic transition layer 131 and a light source 133 disposed near the photochromic transition layer 131 to emit light having a specific wavelength to the photochromic transition layer 131.

In the same manner as the optical filter 130 having the structure illustrated in FIG. 3A, in the optical filter 130, the photochromic transition layer 131 is formed of a photochromic material so as to be changed from a transparent state to an opaque state via a change in the bonding relationship of a chemical constitution thereof when it is irradiated with light.

However, unlike the structure illustrated in FIG. 3A in which the bonding relationship of the photochromic transition layer 131 is restored when heat is applied to the photochromic transition layer 131, in the structure illustrated in FIG. 3C, the bonding relationship of the photochromic transition layer 131 is restored when light having a specific wavelength is applied to the photochromic transition layer 131 so as to return the lighting apparatus 100 from the opaque state to the transparent state.

Here, the wavelength of light from the light source 133 varies depending on the type of photochromic material. The light source 13 may be formed in any of various forms so long as it can emit light to the photochromic transition layer 131.

Figure 4:
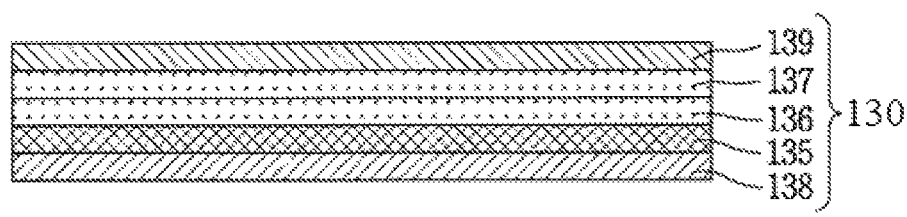
FIG. 4 is a view illustrating another structure of the optical filter according to the present invention.

FIG. 4 is a view illustrating another structure of the optical filter 130 included in the lighting apparatus 100 of the present invention. Here, the optical filter 130 is formed of an electrochromic material.

As illustrated in FIG. 4, the optical filter 130 of the present invention includes a lower electrode layer 138, an electrochromic layer 135 disposed on the lower electrode layer 138, an ion-conducting layer 136 disposed above the electrochromic layer 135, an ion storage layer 137 disposed above the ion-conducting layer 136, and an upper electrode layer 139 disposed above the ion storage layer 137.

The lower electrode layer 138 and the upper electrode layer 139 may be formed of a transparent metal oxide such as ITO or IZO. The electrochromic layer 135 may be formed of an electrochromic material such as transition metal oxides, Prussian blue, phthalocyanines, viologens, conducting polymers, or fullerenes.

The ion-conducting layer 136 may be formed of a liquid electrolyte, a gel electrolyte, a solid electrolyte, a polymer electrolyte, an ionic liquid, or the like. The ion storage layer 137 may be replaced with an electrochromic material having a polarity opposite that of the electrochromic layer 135, and may be omitted in some cases.

In the optical filter 130 having the above-described structure, when a voltage is applied between the lower electrode layer 138 and the upper electrode layer 139 so that current flows from the ion storage layer 137 to the electrochromic layer 135, the optical filter 130 is changed to a colored state and the lighting apparatus 100 enters an opaque state. When no voltage is applied and no current flows or when a reverse voltage is applied so that current flows from the electrochromic layer 135 to the ion storage layer 137, the optical filter 130 is changed to a colorless state and the lighting apparatus 100 enters a transparent state. The colored state or the colorless state depending on the current flow direction may be changed depending on whether the electrochromic layer 135 is reducible or oxidative.

Referring again to FIG. 1, the optical filter 130 is attached to the lower surface of the substrate 110. For example, the photochromic transition layer 131 of the optical filter 130 illustrated in FIGS. 3A and 3C, the thin heat-generating layer 132 of the optical filter 130 illustrated in FIG. 3B, or the upper electrode layer 139 of the optical filter 130 illustrated in FIG. 4 is directly formed on the lower surface of the substrate 110, and the other components of the optical filter 130 are disposed thereunder.

In addition, a first barrier film 112 is disposed on the lower surface of the optical filter 130. The first barrier film 112 may include a plurality of inorganic layers formed of SiNx, SiOx, or the like, or may include a plurality of organic layers formed of photoacryl or the like, in order to prevent the optical filter 130 from deteriorating or being defective due to the introduction of moisture or the like. Here, the first barrier film 112 may include a plurality of organic and inorganic layers.

A first encapsulation layer 114 is provided on the organic light-emitting element 120, and a planarization layer 116 is formed thereabove. In addition, a second encapsulation layer 115 is formed on the planarization layer 116.

The first encapsulation layer 114 and the second encapsulation layer 115 are formed of an inorganic insulation material, an organic insulation material, a resin, or the like, and seals the organic light-emitting element 120 to prevent the introduction of moisture or the like into the organic light-emitting element 120. Here, the first encapsulation layer 114 and the second encapsulation layer 115 may be respectively formed to have a thickness ranging from 4 μm to 5 μm. Although two encapsulation layers 114 and 115 are formed to encapsulate the organic light-emitting element 120 in the drawing, only one encapsulation layer 114 may be formed.

The planarization layer 116 is disposed between the first encapsulation layer 114 and the second encapsulation layer 115 to planarize the lighting apparatus 100. Here, the planarization layer 116 is formed to have a thickness on the order of tens of micrometers using an epoxy-based resin and/or an acryl-based resin.

An adhesive 140 is applied to onto the second encapsulation layer 115, and a second barrier film 150 is disposed thereabove. When the second barrier film 150 is attached to the second encapsulation layer 115 by the adhesive 140, the lighting apparatus 100 is completed.

The adhesive 140 may be a photosetting adhesive or a thermosetting adhesive. The second barrier film 150 may be formed of any of various materials including a polymer such as polyethylene terephthalate (PET) or a thin metal foil such as aluminum.

As described above, the lighting apparatus 100 of the present invention may normally remain in a transparent state and be used as a transparent window, but may be used as a lamp or light source as necessary since it includes the organic light-emitting element 120. In addition, since the lighting apparatus 100 includes the optical filter 130, the transparent window may be changed to an opaque state when the optical filter 130 adjusts the transmittance of light.

Accordingly, the lighting apparatus 100 of the first invention may be used in one or more modes, e.g., three modes including a transparent mode, a lighting mode, and an opaque mode (e.g., a light-blocking mode). This will be described below in more detail with reference to the accompanying drawings.

Figure 5:
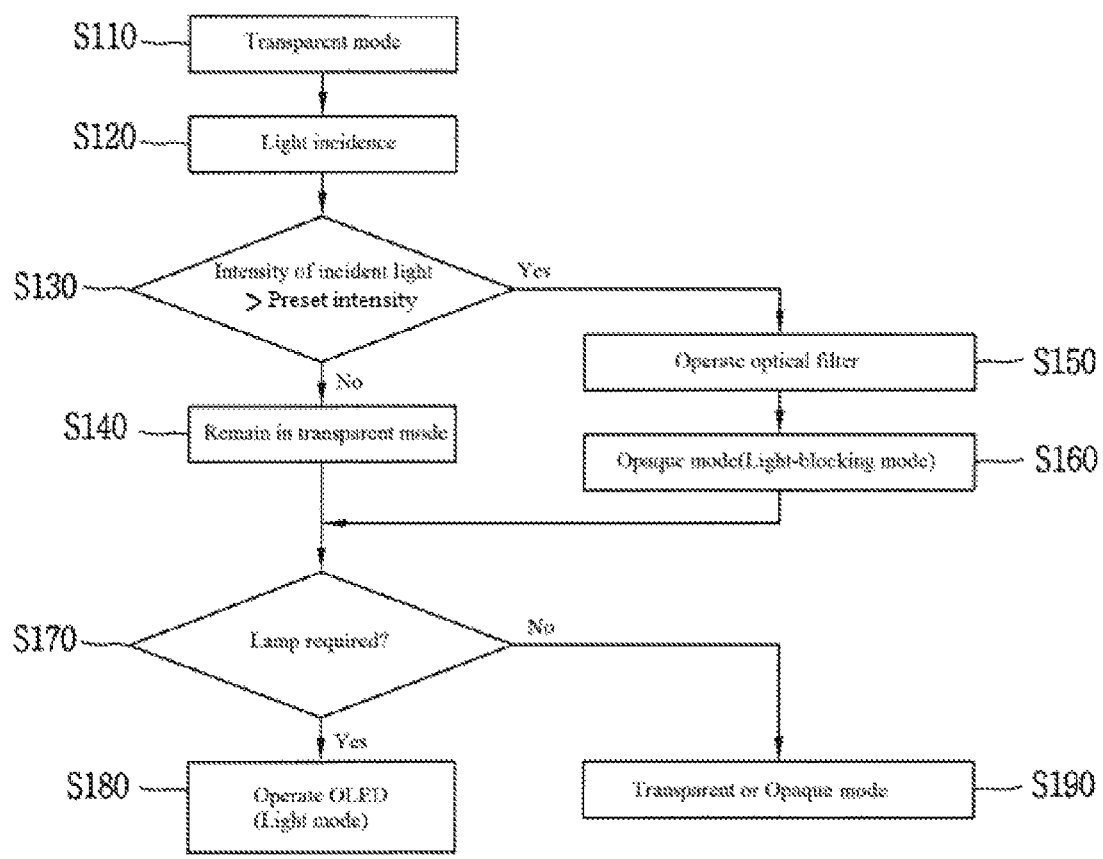
FIG. 5 is a view illustrating a method of switching the lighting apparatus of the present invention from a transparent mode to an opaque mode or a lighting mode.

FIG. 5 is a view illustrating a method of switching the lighting apparatus 100 of the present invention from a transparent mode to an opaque mode or a lighting mode.

As illustrated in FIG. 5, first, when the organic light-emitting element 120 and the optical filter 130 of the lighting apparatus 100 are not operated, the lighting apparatus 100 is switched to a transparent mode and enters a transparent state. For example, the lighting apparatus 100 transmits light thru, like a general window, and the back side thereof appears transparent (S110).

Subsequently, when sunlight or light from an external light source is incident on the lighting apparatus 100 and the intensity of the incident light (or the intensity of the incident ultraviolet light) is lower than or equal to a preset intensity (S130), the optical filter 130 is not operated and the lighting apparatus 100 remains in the transparent mode (S140).

When the intensity of the incident light (or the incident ultraviolet light) is higher than the preset intensity (S130), the optical filter 130 is operated and the lighting apparatus 100 is switched to an opaque mode (e.g., a light-blocking mode) (S150 and S160).

At this time, in the case in which the optical filter 130 is formed of a photochromic material, the optical filter 130 is automatically operated to perform mode switching when the intensity of the incident light is higher than the preset intensity. In addition, in the case in which the optical filter 130 is formed of an electrochromic material, the optical filter 130 is operated when receiving a voltage from the outside. At this time, the application of a voltage may be manually or automatically performed. When a voltage is automatically applied, a separate optical sensor may be disposed on the light transmission side of the lighting apparatus 100 to sense the intensity of light input thereto, thereby applying a start signal to the optical filter 130.

Subsequently, when the surroundings become dark and a lamp is required in the state in which the lighting apparatus 100 remains in the transparent mode (S170), a user operates the organic light-emitting element 120 to drive the lighting apparatus 100 in a lighting mode (S180).

When the surroundings are not dark in the state in which the lighting apparatus 100 remains in the transparent mode, no lamp is required, and therefore, the organic light-emitting element 120 is not operated and the lighting apparatus 100 remains in the transparent mode (S190).

Meanwhile, since the opaque mode is used in an environment in which light having a high intensity is incident on the lighting apparatus 100, the lighting apparatus 100 needs not emit light. However, in the case of an environment like a sealed space that communicates with the outside only through the lighting apparatus 100, light having a preset intensity or lower is introduced into the space even when light having a high intensity is incident on the exterior of the lighting apparatus 100, and therefore, a light generating source/device (e.g., lamp) may be required in order to allow the user to perform a particular operation in the sealed space.

In this case, whether or not a lamp is required is determined (S170), and when the determined result is that a lamp is required, the organic light-emitting element 120 is operated so that the lighting apparatus 100 is driven in a lighting mode (S180) in which light is generated and output by the light-emitting element 120. When the determined result is that no lamp is required, the organic light-emitting element 120 is not operated and thus the lighting apparatus 100 remains in the opaque mode (S190).

Figure 6A:
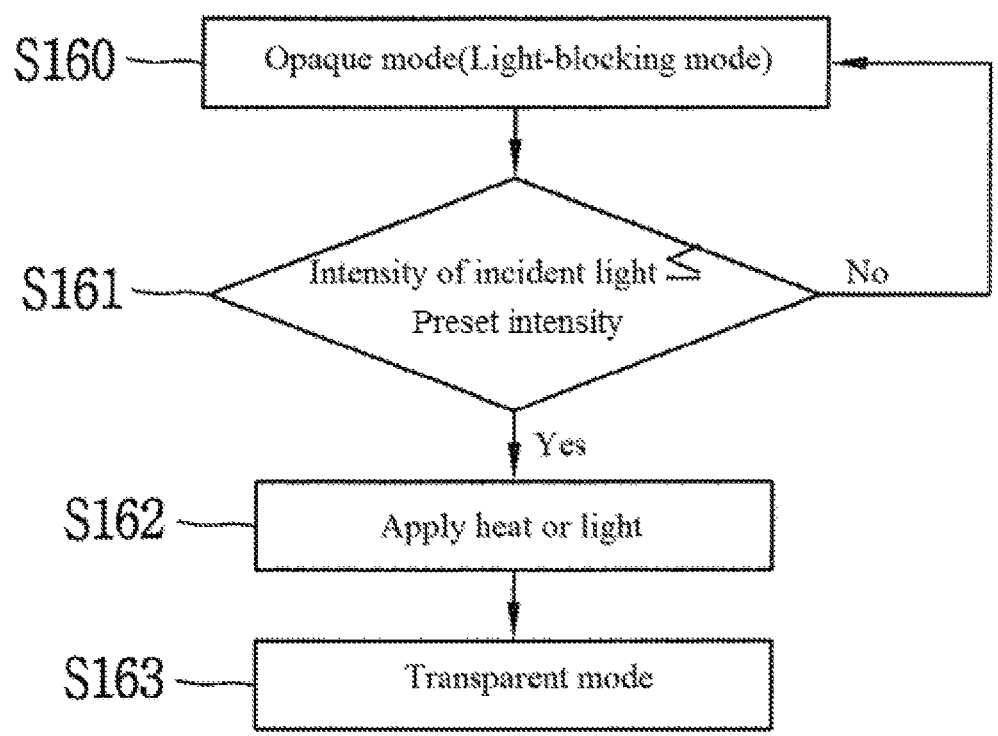
FIGS. 6A and 6B are views illustrating a method of switching the lighting apparatus of the present invention from an opaque mode to a transparent mode.
Figure 6B:
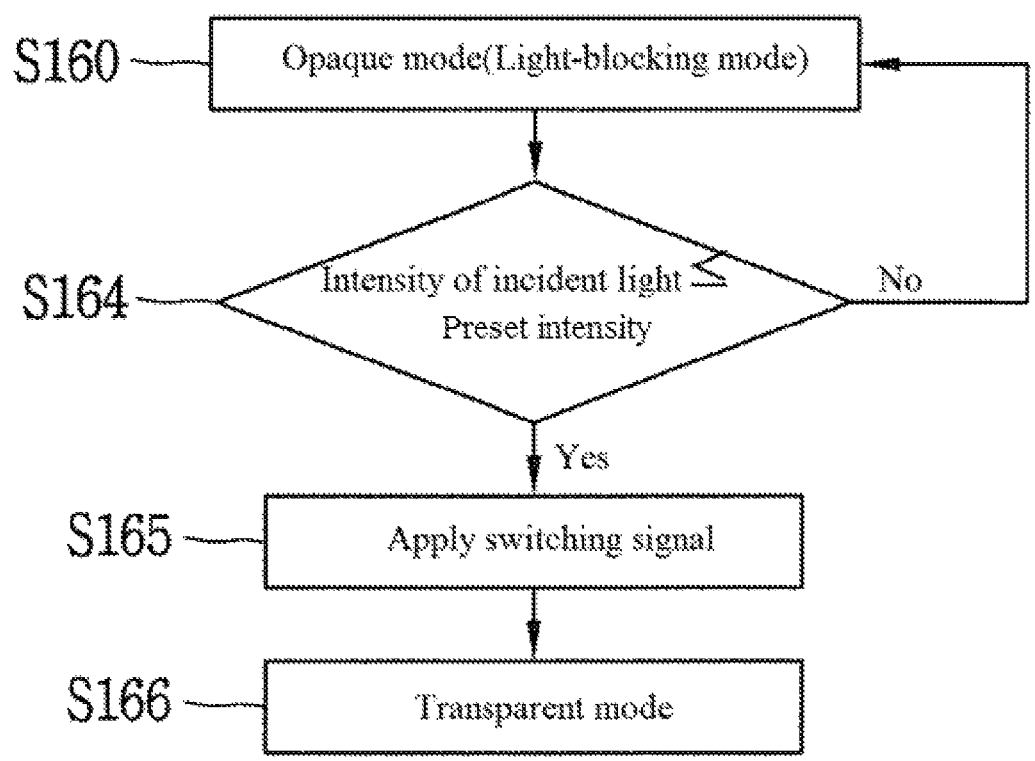

FIGS. 6A and 6B are views illustrating a method of switching the lighting apparatus 100 from an opaque mode to a transparent mode. Here, FIG. 6A illustrates a switching method of the optical filter 130 formed of a photochromic material, and FIG. 6B illustrates a switching method of the optical filter 130 formed of an electrochromic material.

As illustrated in FIG. 6A, when the intensity of light or the intensity of ultraviolet light introduced into the lighting apparatus 100 in the opaque mode decreases and becomes equal to or less than a preset intensity (S160 and S161), a signal is applied to the thin heat-generating layer 132 or the light source 133 to apply heat or light to the photochromic transition layer 131, so that the lighting apparatus 100 is switched to a transparent mode (S162 and S163). In addition, when the intensity of light or the intensity of ultraviolet light introduced into the lighting apparatus 100 is continuously higher than the preset intensity (S161), the lighting apparatus 100 remains in the opaque mode (S160).

Needless to say, when light having an intensity less than the preset intensity is introduced into the lighting apparatus 100, the bonding relationship in the photochromic transition layer 131 may be changed by the light applied thereto so that the optical filter 130 is changed to a transparent state, even if the thin heat-generating layer 132 is not provided. However, since light having such low intensity has insufficient energy to change the bonding relationship of a photochromic material (i.e., since the intensity is less than a critical energy), a sufficient time is required for mode switching, and the lighting apparatus 100 may not be rapidly switched from the opaque mode to the transparent mode depending on the transition of the introduced light.

The thin heat-generating layer 132 or the light source 133 applies bonding energy to the photochromic transition layer 131 so as to rapidly change the bonding relationship of the photochromic material, whereby the lighting apparatus 100 is rapidly switched from the opaque mode to the transparent mode.

As illustrated in FIG. 6B, when the intensity of light introduced into the lighting apparatus 100 decreases and becomes equal to or lower than a preset intensity (S160 and A164), a sensor senses variation in the intensity of light. Based on the sensing of the sensor, a switching signal is no longer applied to the lower electrode layer 138 and the upper electrode layer 139, or a signal opposite that in a transparent mode (i.e., a signal having an opposite polarity) is applied, so that the lighting apparatus 100 is switched to a transparent mode (S165 and S166).

In addition, when the intensity of the light introduced into the lighting apparatus 100 in the opaque mode is continuously higher than the preset intensity (S164), the lighting apparatus 100 remains in the opaque mode (S160).

As described above, in the embodiments of the present invention, the lighting apparatus having the organic light-emitting element is manufactured to be transparent and is provided with the optical filter to prevent the transmission of light having an intensity higher than a preset intensity, whereby it is possible to allow the lighting apparatus to be utilized as a vehicle sunroof or a building window, which is capable of adjusting the transmittance of light and selectively emitting light. Accordingly, since it is not necessary to separately install a window and a lamp, it is possible to minimize manufacturing costs thereof, to reduce the installation space thereof, and to achieve a pleasant outer appearance thereof.

Meanwhile, although the lighting apparatus of the present invention has been described above as having a particular structure, the lighting apparatus of the present invention is not limited to this particular structure, and may be applied to various types of lighting apparatuses such as a dual-side-emission-type lighting apparatus or a flexible lighting apparatus. This will be described hereinafter in more detail.

Figure 7:
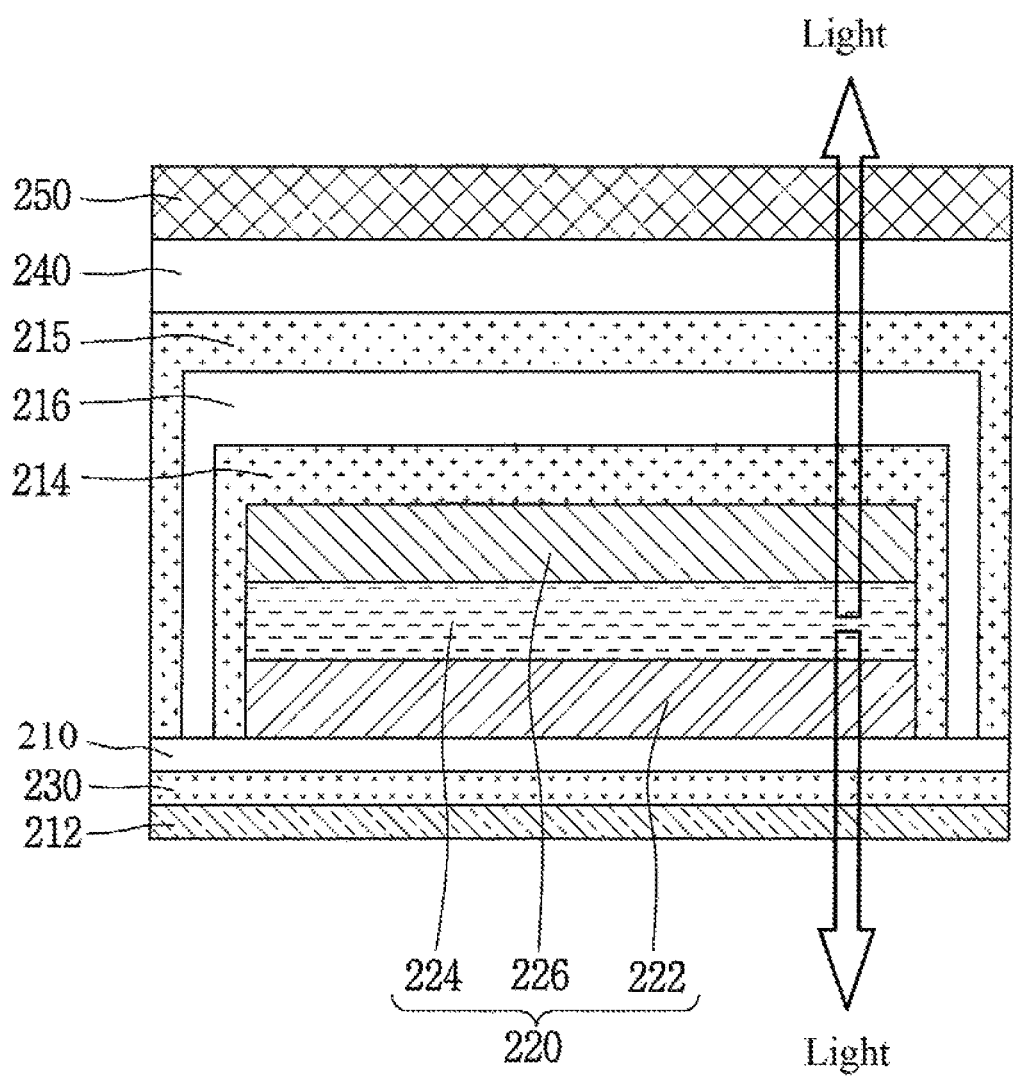
FIG. 7 is a view illustrating a lighting apparatus according to a second embodiment of the present invention.

FIG. 7 is a view illustrating the structure of a lighting apparatus 200 according to a second embodiment of the present invention. The lighting apparatus 200 of the second embodiment is a dual-side-emission-type lighting apparatus that is not flexible. The structure of the lighting apparatus 200 of the second embodiment is similar to the structure of the lighting apparatus 100 of FIG. 1, and thus a description related to the same parts will be omitted or only briefly provided, and only different parts will be described below in detail. In particular, a description of the same parts will be replaced with the description of FIG. 1, although different reference numerals will be given thereto (the parts designated by reference numerals starting with "100" will be designated by reference numerals starting with "200").

As illustrated in FIG. 7, in the lighting apparatus 200 of the second embodiment, light emitted from an organic light-emitting element 230 is output downwards as well as upwards. Here, since a second electrode 226 disposed above an organic emission layer 224 as well as a first electrode 222 disposed below the organic emission layer 224 are formed of a transparent conductive material, light is output both upwards and downwards from the organic emission layer 224.

Unlike the single-side-emission-type lighting apparatus 100 illustrated in FIG. 1 in which the first electrode 122 formed of an opaque metal is formed only in a portion of the pixel, so that a portion of the pixel acts as a transparent window area and the remainder acts as a lighting area, in the dual-side-emission-type lighting apparatus 200 of the present embodiment, the first electrode 222 formed of a transparent conductive material is formed over the entire pixel so that the entire pixel acts as both a transparent window area and a lighting area.

When the lighting apparatus 200 described above is applied to a vehicle sunroof or a building window, the lighting apparatus 200 may emit light in a dark environment to output the light to a passenger compartment of a vehicle or the interior of a building so as to brighten the same, or may output light to the outside of the vehicle or the building so as to impart the vehicle or the building with a pleasant external appearance.

Figure 8A:
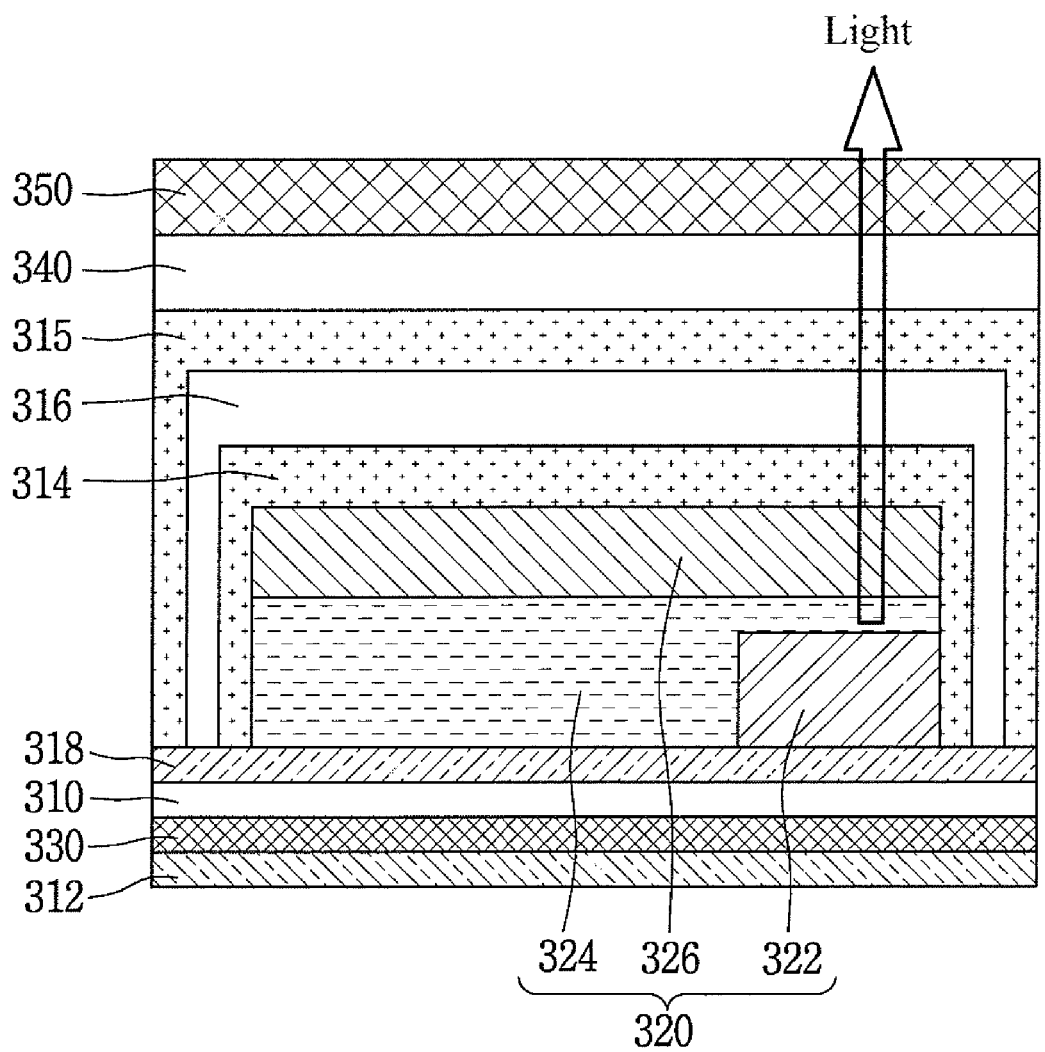
FIGS. 8A and 8B are views illustrating a lighting apparatus according to a third embodiment of the present invention.
Figure 8B:
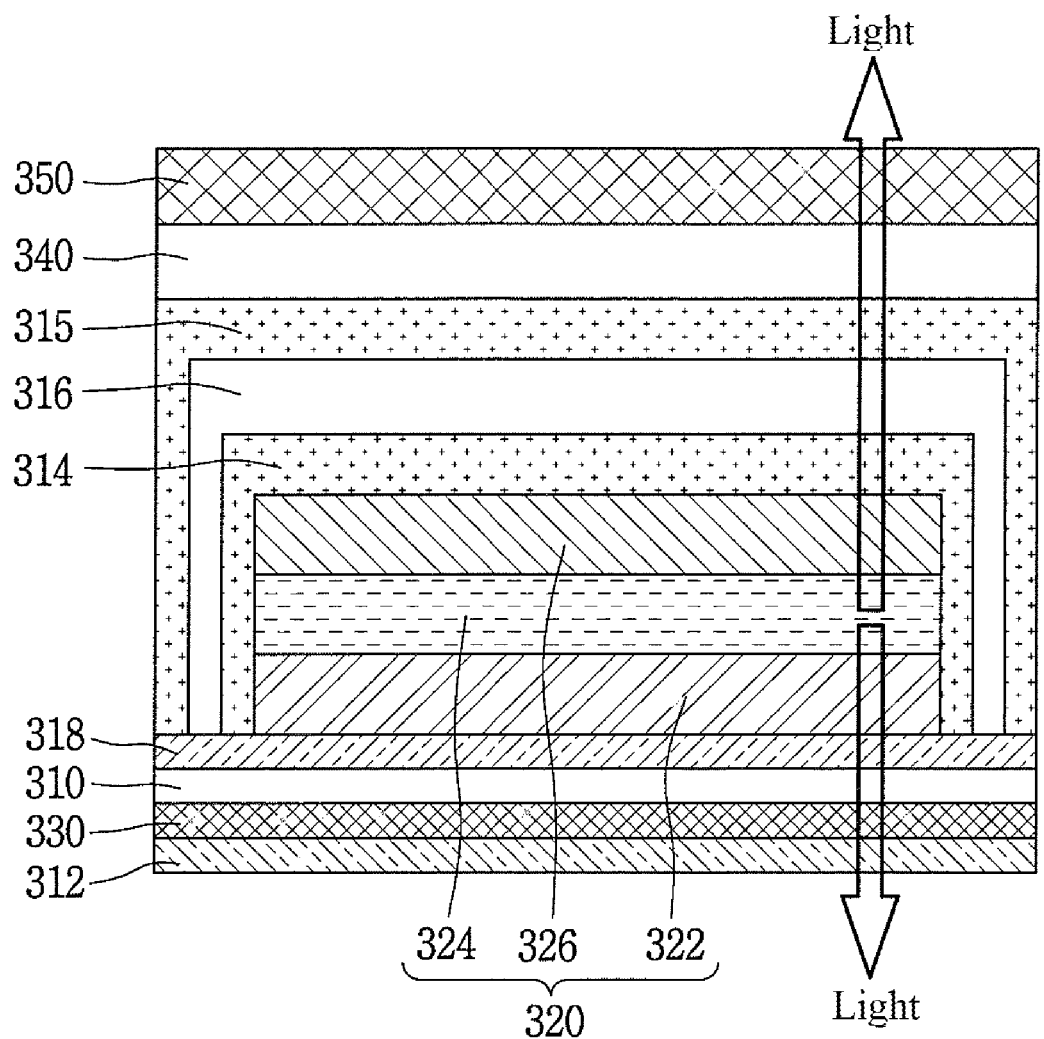

FIGS. 8A and 8B are views illustrating different structures of a lighting apparatus 300 according to a third embodiment of the third invention. Here, the lighting apparatus 300 of the third embodiment is a flexible lighting apparatus. FIG. 8A illustrates a flexible single-side-emission-type lighting apparatus, and FIG. 8B illustrates a flexible dual-side-emission-type lighting apparatus. The structure of the lighting apparatus 300 of the third embodiment is similar to the structure of the lighting apparatus 100 of FIG. 1, and thus a description related to the same parts will be omitted or only briefly provided, and only different parts will be described below in detail. In particular, a description of the same parts will be replaced with the description of FIG. 1, although different reference numerals will be given thereto (the parts designated by reference numerals starting with "100" will be designated by reference numerals starting with "300").

As illustrated in FIG. 8A, the lighting apparatus 300 of the third embodiment differs from the lighting apparatus 100 of the first embodiment illustrated in FIG. 1 in terms of a substrate 310. For example, the lighting apparatus 100 of the first embodiment illustrated in FIG. 1 is a non-flexible lighting apparatus and the substrate 110 is formed of a hard material such as glass, whereas the substrate 310 is formed of a flexible material such as plastic in the present embodiment.

Here, the plastic may be mainly polyimide, but may use polyethylene terephthalate (PET), polyethylene naphthalate (PEN), polycarbonate (PC), an acryl-based material, or the like.

Plastic is more vulnerable to moisture than glass. Therefore, the lighting apparatus 300 of the third embodiment includes a third barrier film 318 between the flexible plastic substrate 310 and an organic light-emitting element 320, so as to prevent an organic emission layer 324 from becoming defective due to moisture introduced into the organic light-emitting element 320 through the substrate 310. Here, the third barrier film 318 may include a plurality of inorganic layers or a plurality of organic layers, or may be formed by alternately laminating a plurality of inorganic layers and a plurality of organic layers.

An optical filter 330 is disposed below the plastic substrate 310, and a first barrier film 312 is attached to the lower surface of the optical filter 330. Here, the optical filter 330 may be formed of a photochromic material or an electrochromic material, and the first barrier film 312 may be attached to the optical filter 330 using an adhesive in order to prevent moisture or the like from being introduced into the optical filter 330.

The organic light-emitting element 320 is disposed on the upper surface of the third barrier film 318, which is attached to the upper surface of the plastic substrate 310, and a first encapsulation layer 314, a planarization layer 316, and a second encapsulation layer 315 are formed thereabove to encapsulate the organic light-emitting element 320 and to planarize the lighting apparatus 300. In addition, when a second barrier film 350 is attached to the second encapsulation layer 315 by an adhesive 340, the lighting apparatus 300 is completed.

As illustrated in FIG. 8B, the lighting apparatus 300 having the above-described structure differs from the lighting apparatus 200 of the second embodiment illustrated in FIG. 7 in terms of the substrate 310. For example, since the lighting apparatus 200 having the structure illustrated in FIG. 7 is not flexible and the substrate 210 is formed of a hard material such as glass, the substrate 310 of the present embodiment is formed of a bendable material such as plastic.

In addition, in the lighting apparatus 300 of the third embodiment, the third barrier film 318 is provided between the flexible plastic substrate 310 and the organic light-emitting element 320 to prevent the organic emission layer 324 from becoming defective due to the introduction of moisture introduced into the organic light-emitting element 320 through the substrate 310. Here, the third barrier film 318 may include a plurality of organic layers or a plurality of inorganic layers, or may be formed by alternately laminating a plurality of inorganic layers and a plurality of organic layers.

The optical filter 330 is disposed below the plastic substrate 310, and the first barrier film 312 is attached to the lower surface of the optical filter 330. Here, the optical filter 330 may be formed of a photochromic material or an electrochromic material, and the first barrier film 312 may be attached to the optical filter 330 using an adhesive in order to prevent moisture or the like from being introduced into the optical filter 330.

The organic light-emitting element 320 is disposed on the upper surface of the third barrier film 318, which is attached to the upper surface of the plastic substrate 310, and the first encapsulation layer 314, the planarization layer 316, and the second encapsulation layer 315 are formed thereabove to encapsulate the organic light-emitting element 320 and to planarize the lighting apparatus 300. In addition, when the second barrier film 350 is attached to the second encapsulation layer 315 by the adhesive 340, the lighting apparatus 300 is completed.

As described above, in the present invention, the lighting apparatus may serve as a transparent window, and may also realize a transparent mode, an opaque mode (light-blocking mode), and a lighting mode as necessary through the use of the optical filter.

Meanwhile, from a different perspective, in the present invention, a window having an optical filter is provided with an organic light-emitting element so that the window capable of adjusting the transmittance of light is used as a lighting apparatus as necessary. In this perspective, the organic light-emitting element may be formed only in a predetermined area, rather than being formed over the entire window.

Figure 9:
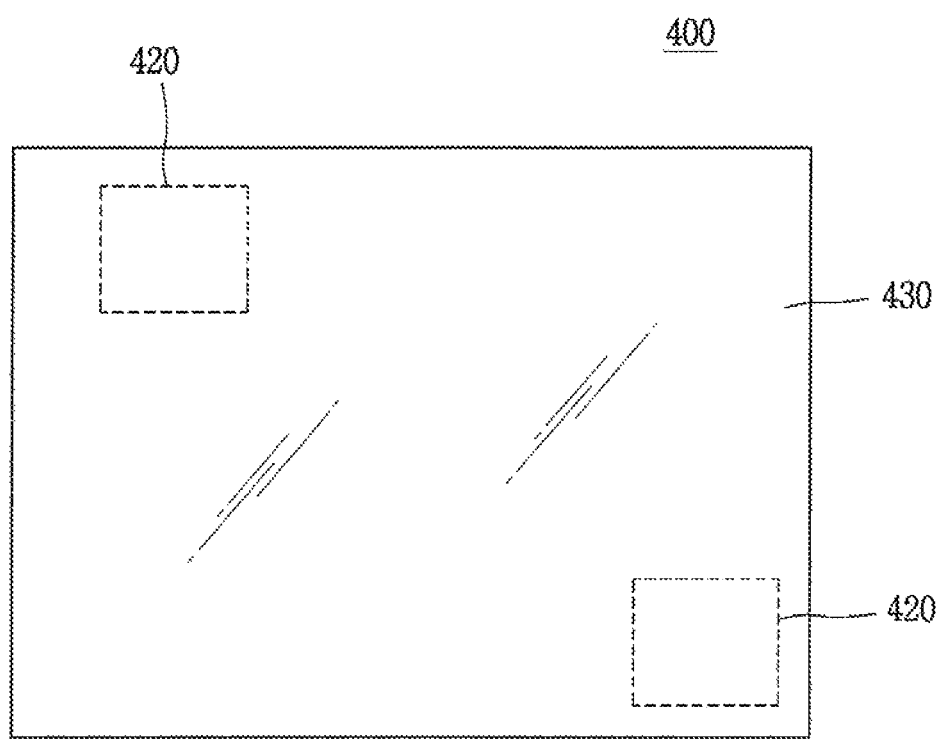
FIG. 9 is a view illustrating a window having an organic light-emitting element provided in a portion thereof according to an example of the present invention.

For example, as illustrated in FIG. 9, an optical filter 430 may be provided over an entire window 400 to set the window 400 to a transparent mode or an opaque mode in order to adjust the transmittance of light therethrough, and an organic light-emitting element 420 may be locally formed in only one area or a plurality of areas of the window 400 so that only a portion of the window 400 may be used as a lighting apparatus. For example, the organic light-emitting element 420, in any shape or pattern, can be provided only in certain area(s) of the window 400.

By locally forming the organic light-emitting element 420 in the window 400 as described above, a predetermined area of the window 400 may be used as a lamp/light source regardless of whether the window 400 is in a transparent mode or an opaque mode. In this way, the present invention may be applied to various products.

Figure 10:
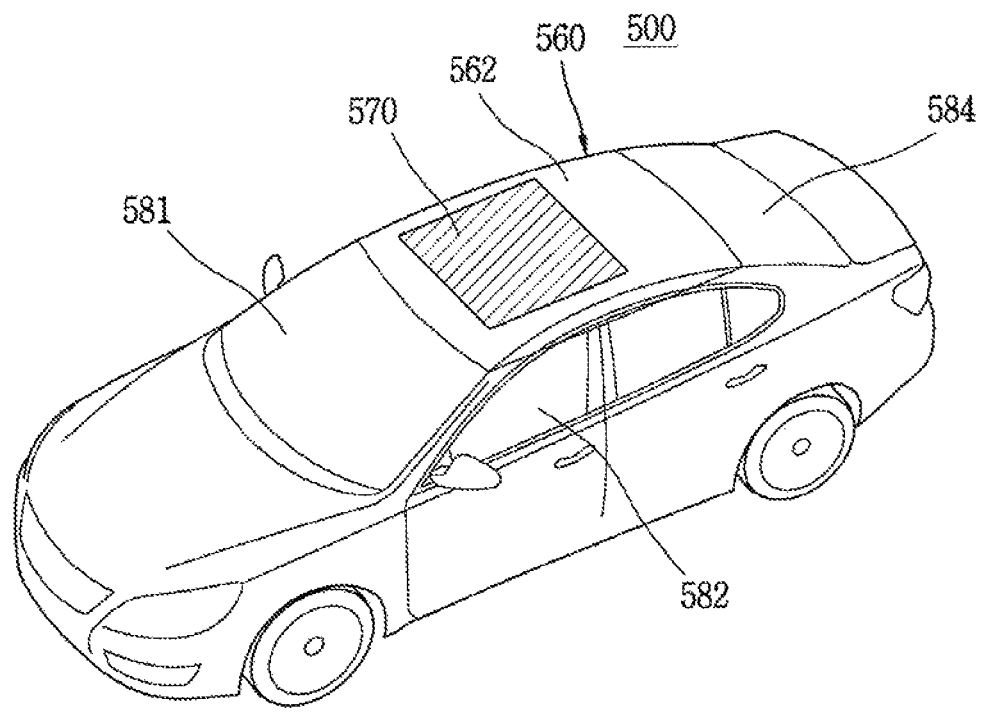
FIG. 10 is a view illustrating a vehicle equipped with a sunroof configured with the lighting apparatus of the present invention.

FIG. 10 is a view illustrating a vehicle 500 equipped with the lighting apparatus of the present invention. The vehicle 500 is merely one example of various products to which the present invention may be applied, and the present invention is not limited thereto.

As illustrated in FIG. 10, windows 581, 582 and 584 are provided on the front side, the rear side, and the lateral side of a body 560 of the vehicle 500, and a sunroof 570 is provided on the ceiling 562. The sunroof 570 is provided so as to be opened and closed, and enables ventilation of the vehicle body 560 when opened to introduce outside air thereinto based on the needs of the user.

In addition, the sunroof 570 may be configured as a transparent lighting apparatus having an optical filter as illustrated in FIGS. 1, 7, 8A and 8B, and may be driven in a transparent mode, an opaque mode (light-blocking mode), or a lighting mode as necessary. Thus, the sunroof 570 may be used as a window, an opaque window having a light-blocking portion, or a lighting apparatus.

Here, when an optical filter is provided over the entire sunroof 570, and an organic light-emitting element is provided in at least one local area of the sunroof 570, the entire sunroof 570 may be used as a window that is driven in a transparent mode and an opaque mode, and only a portion of the sunroof 570 may be used as a lighting apparatus.

Meanwhile, the lighting apparatus that is transparent and has a light-filtering function according to the present invention may not be used only as the sunroof 570 on the ceiling of the vehicle body 560, but may be used as the window 582 on the lateral side or the window 584 on the rear side. In this case, the optical filter may be formed in the entire lateral side window 582 and the entire rear side window 584 so that the lateral side window 582 and the rear side window 584 are driven in a transparent mode or an opaque mode as necessary. An organic light-emitting element may be formed in a portion of each of the lateral side window 582 and the rear side window 584 so as to realize various types of lighting apparatuses.

As described above, in the embodiments of the present invention, since the lighting apparatus has a light-filtering function so as to be driven selectively in a transparent mode, an opaque mode (light-blocking mode), or a lighting mode, the lighting apparatus may be applied to various fields including that of a vehicle sunroof.

Although a particular structure of the present invention has been described above, this is merely given for convenience of description, and the present invention is not intended to be limited to the particular structure.

For example, although the organic light-emitting element and the optical filter having particular structures have been described above in detail, the organic light-emitting element and the optical filter provided in the lighting apparatus of the present invention are not limited to the particular structures, and currently known various structures of organic light-emitting elements and optical filters may be applied to the present invention.

As is apparent from the above description, in the present invention, a lighting apparatus having an organic light-emitting element is manufactured to be transparent and is provided with an optical filter to prevent transmission of light having an intensity higher than a preset intensity. Thereby, when the present invention is applied to a vehicle sunroof or a building window, the vehicle sunroof or the building window may function to adjust the transmittance of light, and may also serve as a lighting apparatus. Since this makes it unnecessary to separately install a window and a lamp/light source, it is possible to minimize the installation space thereof, to reduce manufacturing costs thereof, and to provide a vehicle or a building with a pleasant external appearance.

Various modifications of the present invention, structures that may be easily devised based on the present invention, and the like should be understood to be included in the scope of the present invention. Thus, the scope of the present invention is not determined by the above detailed description, but should be determined by the accompanying claims.

What is claimed is:
1. A lighting apparatus comprising:
a substrate comprising a plurality of pixels and a first surface and a second surface opposite to each other;
an organic light-emitting element disposed on the first surface of the substrate to emit light; and
an optical filter disposed on the second surface of the substrate to adjust a transmittance of light introduced from an outside,
wherein the lighting apparatus operates in one of a transparent mode, a light-blocking mode, and a lighting mode depending on driving of the organic light-emitting element and the optical filter, and wherein the optical filter comprises a photochromic transition layer that is changed in a bonding of a chemical constitution thereof when the photochromic transition layer is irradiated with light.

2. The lighting apparatus according to claim 1, wherein the organic light-emitting element comprises:
a first electrode and a second electrode; and
an organic emission layer disposed between the first electrode and the second electrode to emit light when a signal is applied thereto.

3. The lighting apparatus according to claim 2, wherein the organic light-emitting element performs single-side emission.

4. The lighting apparatus according to claim 3, wherein the first electrode is formed of a metal, and disposed in a portion of each of the plurality of pixels.

5. The lighting apparatus according to claim 2, wherein the organic light-emitting element performs dual-side emission.

6. The lighting apparatus according to claim 5, wherein the first electrode is formed of a transparent conductive material, and disposed in each entire pixel of the plurality of pixels.

7. The lighting apparatus according to claim 1, wherein the optical filter further comprises a thin heat-generating layer or a light source configured to apply energy to the photochromic transition layer.

8. A lighting apparatus comprising:
a substrate comprising a plurality of pixels and a first surface and a second surface opposite to each other;
an organic light-emitting element disposed on the first surface of the substrate to emit light; and
an optical filter disposed on the second surface of the substrate to adjust a transmittance of light introduced from an outside,
wherein the lighting apparatus operates in one of a transparent mode, a light-blocking mode, and a lighting mode depending on driving of the organic light-emitting element and the optical filter, and
wherein the optical filter comprises:
a lower electrode layer;
an electrochromic layer disposed above the lower electrode layer;
an ion-conducting layer disposed above the electrochromic layer;
an ion storage layer disposed above the ion-conducting layer; and
an upper electrode layer disposed above the ion storage layer.

9. The lighting apparatus according to claim 1, further comprising:
a first barrier film disposed below the optical filter;
at least one encapsulation layer disposed above the organic light-emitting element to encapsulate the organic light-emitting element;
a planarization layer disposed above the organic light-emitting element; and
a second barrier film disposed above the organic light-emitting element.

10. The lighting apparatus according to claim 1, wherein the substrate is formed of glass.

11. The lighting apparatus according to claim 1, wherein the substrate is formed of plastic.

12. The lighting apparatus according to claim 11, further comprising a third barrier film disposed on the first surface of the substrate.

13. The lighting apparatus according to claim 1, wherein the organic light-emitting element includes at least one organic light-emitting element disposed in a local area of the substrate.

14. The lighting apparatus according to claim 1, wherein the substrate: is flexible.

15. A vehicle sunroof configured with the lighting apparatus according to claim 1, the vehicle sunroof being disposed on a ceiling of a vehicle, and configured to operate to transmit or block light introduced from an outside depending on an intensity of the light, or function as a light generating source to brighten a compartment of the vehicle.

16. The lighting apparatus according to claim 1, wherein the organic light-emitting element and the optical filter are not operated when the lighting apparatus operates in the transparent mode.

17. The lighting apparatus according to claim 1, wherein the organic light-emitting element is not operated and the optical filter is operated when the lighting apparatus operates in the light-blocking mode.

18. The lighting apparatus according to claim 1, wherein the organic light-emitting element is operated when the lighting apparatus operates in the lighting mode.

* * * * *